United States Patent
Iwadachi

(10) Patent No.: US 6,176,418 B1
(45) Date of Patent: Jan. 23, 2001

(54) COMPOSITE BONDING MATERIAL OF BERYLLIUM, COPPER ALLOY AND STAINLESS STEEL AND COMPOSITE BONDING METHOD

(75) Inventor: Takaharu Iwadachi, Handa (JP)

(73) Assignee: NGK Insulators, Ltd., Nagoya (JP)

( * ) Notice: Under 35 U.S.C. 154(b), the term of this patent shall be extended for 0 days.

(21) Appl. No.: 09/155,816

(22) PCT Filed: Feb. 2, 1998

(86) PCT No.: PCT/JP98/00423

§ 371 Date: Nov. 16, 1998

§ 102(e) Date: Nov. 16, 1998

(87) PCT Pub. No.: WO98/33620

PCT Pub. Date: Jun. 8, 1998

(30) Foreign Application Priority Data

Feb. 3, 1997 (JP) .................................................. 9-020277

(51) Int. Cl.[7] ........................ B23K 20/00; B23K 28/00; B23K 15/06; B23K 31/02; B23K 35/38

(52) U.S. Cl. .......................... 228/193; 228/195; 228/221; 228/223

(58) Field of Search .................................... 228/223, 221, 228/193, 195, 33, 41

(56) References Cited

U.S. PATENT DOCUMENTS

| | | | |
|---|---|---|---|
| 4,830,933 | * 5/1989 | Hodes et al. | 428/646 |
| 5,820,721 | * 10/1998 | Beane et al. | 156/276 |
| 5,901,336 | * 5/1999 | Dombrowski | 419/6 |
| 5,972,521 | * 10/1999 | Huskamp et al. | 428/547 |

FOREIGN PATENT DOCUMENTS

| | | | |
|---|---|---|---|
| 0001173 | * 5/1978 | (EP) | 75/10.23 |
| 3-251800 | 11/1991 | (JP) . | |

\* cited by examiner

*Primary Examiner*—Patrick Ryan
*Assistant Examiner*—Zidia T. Pittman
(74) *Attorney, Agent, or Firm*—Burr & Brown

(57) ABSTRACT

According to the present invention, an insert material is laid between metal beryllium and copper alloy, wherein the insert material has the minimum, solidus temperature of not lower than 870° C. to the metal beryllium and copper alloy, respectively, and a single diffusion bonding process is performed under the condition that the temperature is not lower than 850° C. and less than the minimum solidus temperature, and the pressure is 20 to 300 MPa, so that the metal beryllium, copper alloy and stainless steel can be effectively bonded without deterioration of corrosion resistance for sensitizing of the stainless steel.

11 Claims, 2 Drawing Sheets

COMPOSITE BONDING MATERIAL OF BERYLLIUM, COPPER ALLOY AND STAINLESS STEEL AND COMPOSITE BONDING METHOD

This application is a 371 of PCI/JP98/00423 filed on Feb. 2, 1998.

TECHNICAL FIELD

This invention relates to composite bonding technology for different kind of materials, which can be used to effectively bond metal beryllium, copper alloy and stainless steel.

BACKGROUND ART

Recently, the industry became interested in developing composite bonding technology for bonding various materials having different properties to each other to form a composite body.

Such bonding materials include metal beryllium, which is used for various purposes, such as transmission windows for X-ray, equipment due to excellent X-ray transmissibility and various applications related to nuclear equipment.

For applying to X-ray windows, it has been conventional practice to bond metal beryllium to a flange or like structural body made of stainless steel by brazing or diffusion bonding. However, stainless steel to which metal beryllium has been directly bonded suffers from a general problem of insufficient thermal conductivity.

Therefore, in order to improve thermal conductivity, a bonding process has been developed in which the copper alloy is bonded to a structural body of stainless steel in advance, and the metal beryllium is then bonded to the bonded body of copper alloy and stainless steel.

However, the above-mentioned bonding process requires that, after the stainless steel and copper alloy have been bonded to each other, an additional step is required to bond the metal beryllium to the bonded body of copper alloy and stainless steel by brazing or diffusion bonding, so that there remain problems that not only the bonding treatment is complicated, but also it is costly to perform.

Also, it has been a general practice that the brazing or diffusion bonding of metal beryllium be performed at a temperature within a range of 650 to 800° C. This temperature range overlaps with the sensitizing temperature of the stainless steel. However, when brazing or diffusion bonding is performed in such a temperature range the corrosion resistance of the stainless steel is significantly diminished.

SUMMARY OF THE INVENTION

The invention serves to solve the above-mentioned problems. It is an object of the invention to provide a composite bonded body in which metal beryllium, copper alloy and stainless steel are effectively bonded to each other without the problem relating to the sensitizing of the stainless steel, as well as an advantageous bonding method therefor.

The details of the development which resulted in the invention will be described below.

As mentioned above, the conventional method for bonding metal beryllium, copper alloy and stainless steel to each other is to bond a copper alloy to a structural body made of stainless steel in advance, and then further bond the metal beryllium to the bonded body of copper alloy and stainless steel.

The reason for this procedure is that is because a satisfactory bonded body can not be obtained when metal beryllium, copper alloy and stainless steel are to be bonded to each other simultaneously. More specifically, the preferable bonding temperature of copper alloy and stainless steel is a relatively high temperature of 850 to 1050° C., while the preferable bonding temperature of metal beryllium and copper alloy is a relatively low temperature of not higher than 800° C. Therefore, when the bonding is performed in the former case at relatively high temperatures beryllium and copper alloy react with each other to form a eutectic alloy having a low melting point causing the bonding surface to melt. On the other hand, when the bonding is performed in the latter case at low temperatures a sufficient bond between the copper alloy and the stainless steel is not achieved.

The inventors conducted thorough investigations for the purpose of solving the above-mentioned ambivalent problems, and arrived at the novel recognition that the above mentioned object of the invention can be advantageously achieved by interposing an insert material between the metal beryllium and copper alloy, which presents the formation of an eutectic alloy of a low melting temperature even when reacted with metal beryllium or stainless steel.

The invention is based on the above-mentioned recognition, and featured by the following constitutions.

1. A composite bonded body of metal beryllium, copper alloy and stainless steel, all of which are joined by a single diffusion bonding process with the stainless steel as a substrate, the copper alloy bonded to the surface of stainless steel, substrate and the metal beryllium bonded to the outer surface of said copper alloy.

2. A composite bonding method for bonding metal beryllium, copper alloy and stainless steel, all of which are sequentially depoisted on the outer surface and bonded to each other in this order, wherein an insert material is interposed between the metal beryllium and copper alloy, layers said insert material having the minimum solidus temperature of not lower than 870° C. relative to the metal beryllium and copper alloy, respectively, and a single diffusion bonding process is performed at a temperature not lower than 850° C. and less than the minimum solidus temperature, and at a pressure at 20 to 300 MPa, so that the metal beryllium, copper alloy and stainless steel are simultaneously bonded to each other.

3. A composite bonding method for bonding metal beryllium, copper alloy and stainless steel according to paragraph 2 above, wherein said insert material interposed between the metal beryllium and copper alloy is niobium metal.

4. A composite bonding method for bonding metal beryllium, copper alloy and stainless steel according to paragraph 2 above, wherein said insert material interposed between the metal beryllium and copper alloy is molybdenum metal.

5. A composite bonding method of metal beryllium, copper alloy and stainless steel according to paragraph 2 above, wherein said insert material interposed between the metal beryllium and copper alloy is titanium metal.

6. A composite bonding method of metal beryllium, copper alloy and stainless steel according to paragraph 2, 3, 4 or 5 above, wherein a nickel intermediate layer is formed between the stainless steel and copper alloy.

DESCRIPTION OF THE PREFERRED EMBODIMENT

The invention will be described in further detail below.

Figure 1:
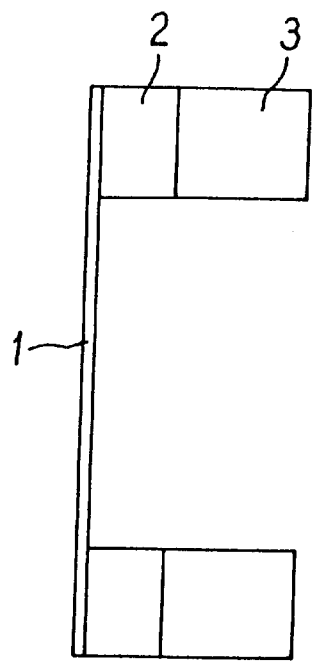
FIG. 1 is a perspective view of X-ray windows.

There is schematically shown in FIG. 1 an X-ray window which has been formed by the bonding process described herein. In FIG. 1, reference numeral 1 designates a beryllium foil, 2 a copper alloy, and 3 a structural body made of stainless steel.

In the arrangement shown in FIG. 1, stainless steel is used as the structural body for providing a predetermined strength and corrosion resistance to the cooling water. As such stainless steel, there may be advantageously used austenitic stainless steel such as SUS 304, SUS 316, SUS 316L, SUS 316LN, or ferritic stainless steel such as SUS 430, SUS 430LX, SUS 434, SUS 436.

Also, the copper alloy used as a heat dissipation material is preferably comprised of oxygen free copper (OFC), alumina dispersion-strengthened copper (DSCu), beryllium copper (C17510, C17500, etc.), chromium-zirconium copper or the like.

Figure 2:
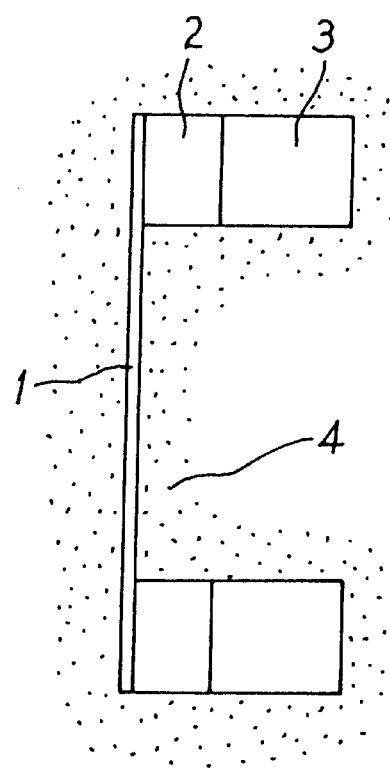
FIG. 2 is a perspective view of a glass coating HIP bonding method.

According to the present invention, when the stainless steel, copper alloy and metal beryllium are bonded to each other simultaneously, the preferable bonding process employed is a so-called glass-coated HIP (hot isostatic press) bonding wherein, as shown in FIG. 2, the bonded body as a whole is covered with glass powder 4 and then subjected to heating under pressure.

In general, when stainless steel and copper alloy are bonded by the HIP process, the preferred heating temperature is within a range of about 850 to 1050° C. However, if the metal beryllium, copper alloy and stainless steel are simultaneously bonded to each other under such a temperatures, an eutectic alloy having a low melting point is formed between the copper alloy and metal beryllium preventing the formation of a strong bond.

It is desirable to form interface bonds capable of withstanding 70 MPa of pressure or preferably not less than 100 MPa of pressure.

On the other hand, according to the invention, niobium, molybdenum, titanium or the like metal is interposed as an insert material between the metal beryllium and copper alloy, so as to advantageously avoid the above-mentioned disadvantages.

This is due to the fact that when, for example, a niobium metal is interposed between the metal beryllium and stainless steel, a eutectic alloy is formed at the interface of the niobium and beryllium having a melting point of 1440° C. which is not only higher than the melting point (866° C.) of the eutectic alloy formed between beryllium and copper alloy, but also higher than the melting point (1289° C.) of the metal beryllium itself. Also, while the minimum solidus temperature of the alloy formed from the niobium metal and copper alloy is not always definite, it is well higher than the melting point of the alloy made from the metal beryllium and copper alloy, so that particular problems do not occur even when the three materials are simultaneously bonded to each other by HIP bonding at temperatures at or below 850° C.

Similarly, when molybdenum metal is interposed between metal beryllium and stainless steel, the eutectic alloy formed between the molybdenum and beryllium has a melting point of 1827° C., and the minimum solidus temperature of alloy formed from the molybdenum metal and copper alloy alone is higher than melting point of the copper alloy, so that particular problems do not occur even when the three materials are simultaneously bonded to each other by HIP bonding at temperatures at or below 850° C.

Also, when a titanium metal is interposed between the metal beryllium and stainless steel, the minimum solidus temperature of the alloy formed from the titanium metal and metal beryllium is 980° C., and the minimum solidus temperature of the alloy formed from the titanium metal and copper alloy is 885° C., so that particular problems do not occur even when the three materials are simultaneously bonded to each other by HIP bonding at a temperature greater 850° C.

Therefore, according to the invention, when metal beryllium, copper alloy and stainless steel are bonded to each other by HIP bonding, an insert material is interposed between the metal beryllium and stainless steel, which comprises niobium, molybdenum, titanium or the like metal capable of forming an alloy with the metal beryllium or copper alloy, having the minimum solidus temperature of not lower than 870° C.

According to the invention, it is preferable that the thickness of the insert material be within a range of 0.5 to 600 μm. When the thickness of the insert metal is less than 0.5 μm, as a diffusion barrier cannot be achieved. When when the thickness of the insert metal exceeds 600 μm, the effect of beryllium is maximized besides that an excessive thickness is disadvantageous from economical viewpoint.

The method of forming the insert material is not limited to a specific process. The available methods, include, but are not limited to, physcially inserting a metal foil between the substrate layers, a PVD processing such as vapor deposition, sputtering, magnetron sputtering, ion plating or the like, or an ordinary plating process.

By interposing niobium, molybdenum, titanium or like insert material between the metal beryllium and copper alloy, in the manner described above, it is possible to perform bonding by a HIP process under a temperature condition of not less than 850° C., which is suitable for bonding the metal beryllium and copper alloy. However, when the bonding temperature is higher than the minimum solidus temperature of the alloy formed between the insert material and beryllium or between the insert material and copper alloy, the bonding interface melts. Therefore, according to the invention, the upper limit of the bonding temperature is decreased below the minimum solidus temperature.

Also, it is necessary that the pressure for the HIP bonding process be within a range of 20 to 300 MPa. This is due to the fact that, when the pressure is lower than 20 MPa, satisfactory diffusion bonding is not achieved, and when the pressure is higher than 300 MPa, the benifits of increased pressure are maximized and the apparatus becomes costly which is not advantageous from economical viewpoint.

In addition, according to the invention, it is advantageous to form a nickel intermediate layer between the stainless steel and copper alloy. This is due to the fact that, when such a nickel intermediate layer is present, the stainless steel and copper alloy can be bonded to each other not only easily and at a relatively low temperature, but also in such a manner as to improve the bond strength.

For example, when the stainless steel and alumina dispersion strengthened copper (DSCu) are directly bonded to each other, the bond is strong enough to withstand forces within a range of 130 to 180 MPa. In contrast, when a nickel intermediate layer is formed between the stainless steel and alumina dispersion strengthened copper, it is possible to achieve a bond strengths of at least 250 MPa and higher.

The process of forming intermediate layer is similar to the above-mentioned process of forming the insert material, and the preferable thickness of the intermediate layer is within a range of 1 to 50 μm.

DESCRIPTION OF THE PREFERRED EMBODIMENT

EXAMPLE 1

Figure 3:
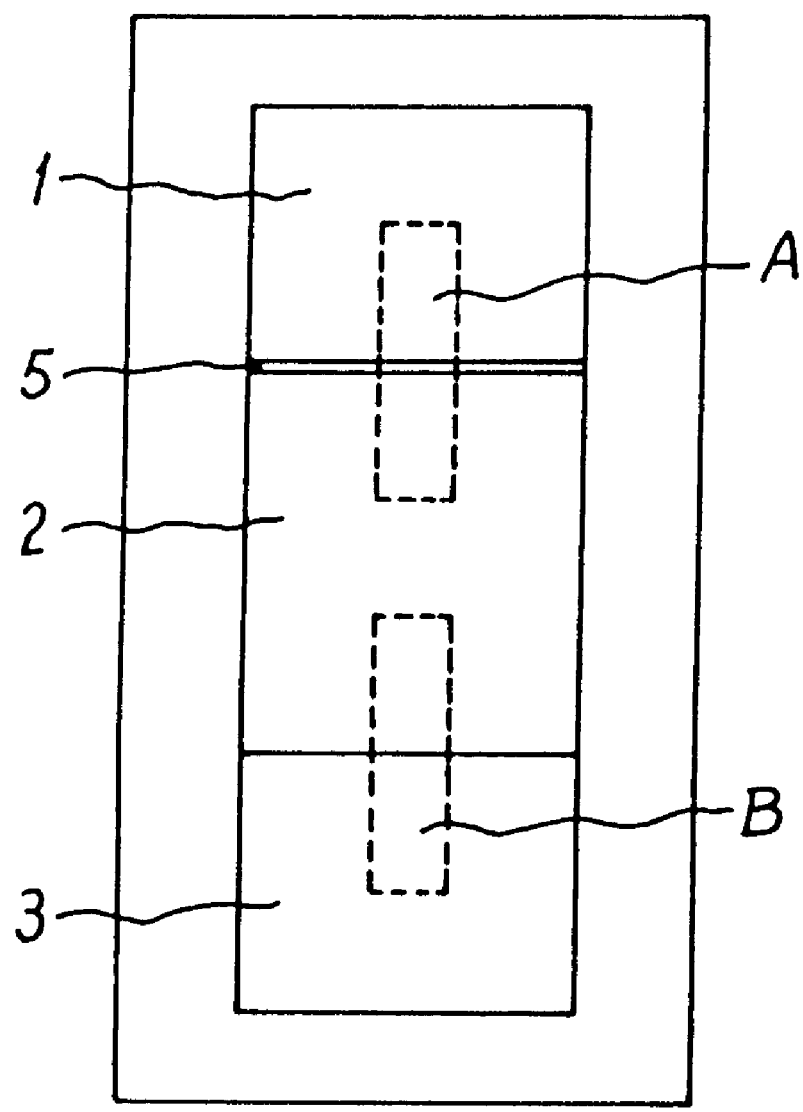
FIG. 3 is an explanatory view of showing the bonding between metal beryllium, copper alloy and stainless steel according to one embodiment of the invention.

In oxygen free copper (OFC) was used as a component of the copper alloy, and SUS 316 was used as stainless steel. Then, a metal beryllium, the oxygen free copper and SUS 316 were joined as shown in FIG. 3. In this instance, an insert material 5 was interposed between the metal beryllium and the oxygen free copper in various methods as shown in Table 1. Also, for some specimens shown in Table 1, a nickel layer was interposed between the oxygen free copper and SUS 316.

Each joined body was placed in a stainless steel casing with a thickness of 2 mm, and the casing was sealed by TIG welding after establishing a vacuum within the casing.

In the next place, these joined bodies were bonded by HIP process under the conditions shown in Table 1, to form composite bonded bodies.

Then, shearing test samples as shown by broken lines A and B in FIG. 3 were cut off from the so-obtained composite bonded bodies, and subjected to simple shear test.

Also, corrosion resistance test pieces were cut off from the SUS 316 part of the composite bonded bodies, and were subjected to 65% nitric acid test in conformity with JIS G 573.

The results of the above-mentioned tests are also shown in Table 1.

Also, for the purpose of comparison, Table 1 further shows the results of tests with respect to composite bonding performed without interposing an insert materials.

As can be appreciated from Table 1 above, in the case of specimens according to the invention (Nos. 1 to 7), which were prepared by interposing an appropriate insert material between the metal beryllium and copper alloy, and performing HIP process at a temperature of not lower than 850° C., it is possible to achieve a satisfactory shear strength at the Be/OFC interface and OFC/SUS 316 interface, as well as an excellent corrosion resistance. Particularly, the specimens formed by interposing a Ni intermediate layer between OFC/SUS 316 exhibit a further improvement in terms of the interface shear strength.

On the contrary, when HIP bonding was performed at a temperature greater than 850° C. without interposing an insert material (No. 8), the Be/OFC interface melted during the bonding and separation took place at the bond interface.

In this context, the specimens labeled No. 9 and No. 10, which were prepared by performing HIP bonding at a temperature of not higher than 800° C., did not suffer from problems related to the bonding strength, though it was observed that a marked deterioration of the corrosion resistance took place due to the overlap of the treatment temperature with the sensitization temperature of the stainless steel.

EXAMPLE 2

In Example 2, alumina dispersion-strengthened copper (DSCu) was used as a component of the copper alloy, and SUS 316LN stainless steel was used, to form composite bonded bodies under the condition shown in Table 2, and in the manner similar to the method employed to form the previously described embodiment.

The results of shear test and 65% nitric acid test performed with respect to the so-obtained bonded bodies are shown in Table 2.

For the purpose of comparison, Table 2 further shows the results of tests performed with respect to the composite bonding without interposing an insert material between the copper alloy and stainless steel layers.

TABLE 1

| No. | Insert material and thickness (μm) | Method of forming insert material | Presence and thickness of nickel intermediate layer (μm) | Method of forming nickel intermediate layer | HIP temperature, time (° C. × h) | HIP pressure (MPa) | BE/Cu interface shear strength (MPa) | Cu/stainless steel interface shear strength (MPa) | Corrosion speed (g/m² · h) | Note |
|---|---|---|---|---|---|---|---|---|---|---|
| 1 | Nb (50 μm) | foil inserted | none | — | 900 × 2 | 140 | 130 | 100 | <0.1 | Inventive Example |
| 2 | Nb (10 μm) | sputtering | none | — | 1050 × 2 | 140 | 140 | 180 | <0.1 | Inventive Example |
| 3 | Mo (5 μm) | sputtering | none | — | 1000 × 2 | 100 | 110 | 170 | <0.1 | Inventive Example |
| 4 | Nb (2 μm) | vapor deposition | presence (5 μm) | plating | 950 × 2 | 150 | 130 | 175 | <0.1 | Inventive Example |
| 5 | Ti (10 μm) | vapor deposition | presence (5 μm) | plating | 850 × 4 | 140 | 120 | 170 | 0.1 | Inventive Example |
| 6 | Nb (10 μm) | ion plating | presence (2 μm) | plating | 950 × 2 | 50 | 100 | 180 | <0.1 | Inventive Example |
| 7 | Mo (10 μm) | vapor deposition | presence (10 μm) | plating | 900 × 2 | 100 | 90 | 175 | <0.1 | Inventive Example |
| 8 | none | — | none | — | 880 × | 140 | Be/Cu interface was melted, separation took place at the bonded part | | | Comparative Example |
| 9 | none | — | non | — | 700 × 2 | 140 | 130 | 60 | 1.8 | Comparative Example |
| 10 | none | — | none | — | 800 × 2 | 140 | 120 | 80 | 1.2 | Comparative Example |

TABLE 2

| No. | Insert material and thickness (μm) | Method of forming insert material | Presence and thickness of nickel intermediate layer (μm) | Method of forming nickel intermediate layer | HIP temperature, time (° C. × h) | HIP pressure (MPa) | BE/Cu interface shear strength (MPa) | Cu/stainless steel interface shear strength (MPa) | Corrosion speed (g/m² · h) | Note |
|---|---|---|---|---|---|---|---|---|---|---|
| 11 | Nb (50 μm) | foil inserted | none | — | 900 × 2 | 140 | 140 | 180 | <0.1 | Inventive Example |
| 12 | Nb (10 μm) | sputtering | none | — | 1050 × 2 | 140 | 150 | 300 | <0.1 | Inventive Example |
| 13 | Mo (5 μm) | sputtering | none | — | 1000 × 2 | 100 | 120 | 280 | <0.1 | Inventive Example |
| 14 | Nb (2 μm) | vapor deposition | presence (5 μm) | plating | 950 × 2 | 150 | 155 | 280 | <0.1 | Inventive Example |
| 15 | Ti (10 μm) | vapor deposition | presence (5 μm) | plating | 850 × 4 | 140 | 120 | 260 | <0.1 | Inventive Example |
| 16 | Nb (10 μm) | ion plating | presence (2 μm) | plating | 950 × 2 | 50 | 100 | 285 | <0.1 | Inventive Example |
| 17 | Mo (10 μm) | vapor deposition | presence(10 μm) | plating | 900 × 2 | 100 | 95 | 275 | <0.1 | Inventive Example |
| 18 | none | — | none | — | 880 × | 140 | Be/Cu interface was melted, separation took place at the bonded part | | | Comparative Example |
| 19 | none | — | non | — | 700 × 2 | 140 | | 60 | 1.9 | Comparative Example |
| 20 | none | — | none | — | 800 × 2 | 140 | | 100 | 1.3 | Comparative Example |

According to the present invention, it is possible simultaneously to perform a composite bonding of metal beryllium, copper alloy and stainless steel, by a single bonding treatment, without deterioration of corrosion resistance for sensitizing of the stainless steel. The bonding treatment is easy to perform, and a significant reduction in terms of production cost can be achieved.

What is claimed is:

1. A composite bonded body of metal beryllium, copper alloy and stainless steel, which are joined by a single diffision bonding process with the stainless steel as a substrate, the copper alloy joined over the stainless steel, and the metal beryllium joined over said copper alloy.

2. A composite bonding method for bonding metal beryllium, copper alloy and stainless steel, which are superimposed and bonded to each other in this order, wherein an insert material is laid between the metal beryllium and copper alloy, said insert material having the minimum solidus temperature of not lower than 870° C. and a single diffusion bonding process is performed under the condition that the temperature is not lower than 850° C. and less than the minimum solidus temperature, and the pressure is 20 to 300 MPa, so that the metal beryllium, copper alloy and stainless steel are simultaneously bonded to each other.

3. A composite bonding method for bonding metal beryllium, copper alloy and stainless steel according to claim 2, wherein said insert material laid between the metal beryllium and copper alloy is niobium metal.

4. A composite bonding method for bonding metal beryllium, copper alloy and stainless steel according to claim 2, wherein said insert material laid between the metal beryllium and copper alloy is molybdenum metal.

5. A composite bonding method of metal beryllium, copper alloy and stainless steel according to claim 2, wherein said insert material laid between the metal beryllium and copper alloy is titanium metal.

6. A composite bonding method of metal beryllium, copper alloy and stainless steel according to claim 2 or wherein a nickel intermediate layer is formed between the stainless steel and copper alloy.

7. A composite bonded body of metal beryllium, copper alloy and stainless steel according to claim 1, further comprising an insert layer between the metal beryllium layer and the copper alloy layer, wherein said insert layer has a minimum solidus temperature of 870° C. or greater.

8. A composite bonded body of metal beryllium, copper alloy and stainless steel according to claim 7, wherein said insert layer is comprised of niobium.

9. A composite bonded body of metal beryllium, copper alloy and stainless steel according to claim 7, wherein said insert layer is comprised of molybdenum.

10. A composite bonded body of metal beryllium, copper alloy and stainless steel according to claim 7, wherein said insert layer is comprised of titanium.

11. A composite bonded body of metal beryllium, copper alloy and stainless steel according to claim 1, further comprising of a nickel intermediate layer formed between the stainless steel and copper alloy.

* * * * *